Oct. 2, 1956    T. D. H. ANDREWS    2,765,413
MEANS FOR CHARGING ELECTROSCOPES
Filed Jan. 21, 1953

Inventor
THOMAS DESMOND HUDSON ANDREWS

By
Attorney

United States Patent Office 2,765,413
Patented Oct. 2, 1956

2,765,413

MEANS FOR CHARGING ELECTROSCOPES

Thomas D. H. Andrews, Cheltenham, England, assignor to Dowty Nucleonics Limited, a corporation of Great Britain Application January 21, 1953, Serial No. 332,365

1 Claim. (Cl. 250—83.6)

This invention relates to charging units for electroscopes, and is particularly concerned with charging units for electroscopes of the kind known as dosimeters and employed, for example, in atomic research laboratories.

Instruments of the foregoing kind comprise a tubular casing having an eyepiece at one end and a charging pin coaxially arranged in the opposite end, the intermediate portion of the instrument having a translucent scale which is viewed through the magnifying eyepiece and over which an indicating element in the form of a fine quartz fibre moves. The dosimeter is charged until the indicating element moves to the zero position on the scale and any exposure of the charged instrument to high energy radiations, for example gamma rays, will cause the instrument to be discharged in proportion to the strength and/or time of exposure to such rays and the indicating element to move away from the zero position.

The object of the invention is to provide a compact and portable charging unit which will enable rapid and accurate charging of electroscopes of the aforesaid kind to be achieved utilising light from an outside source, independent of the charging unit, to illuminate the scale of the electroscope.

Preferably the charging unit comprises a casing, a source of electrical energy within said casing, a socket adapted to receive the end of the electroscope and to conduct a charge from said source of electrical energy to the charging pin of the electroscope, and reflector means arranged externally of the casing and by means of which light from an outside source can be reflected through the socket to illuminate the scale of the electroscope.

Preferably the source of electrical energy comprises a generator which may, if desired, be hand-driven.

Figure 1:
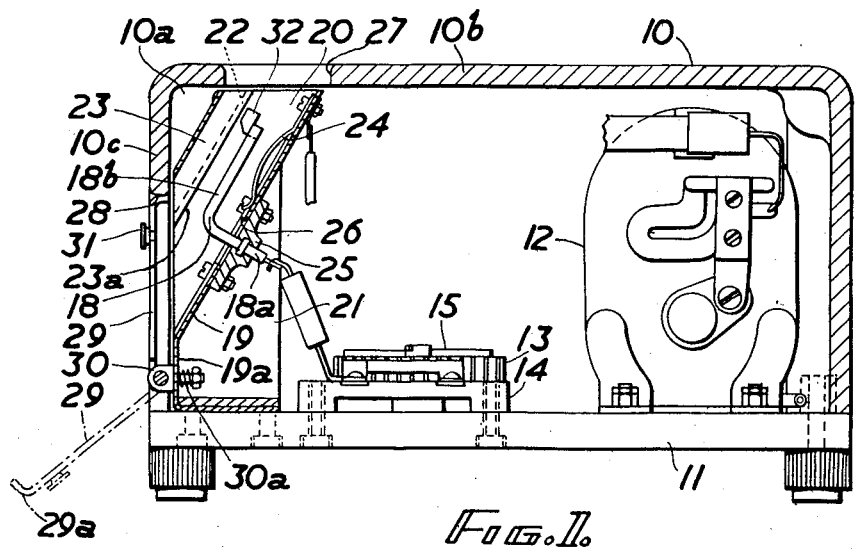
Figure 2:
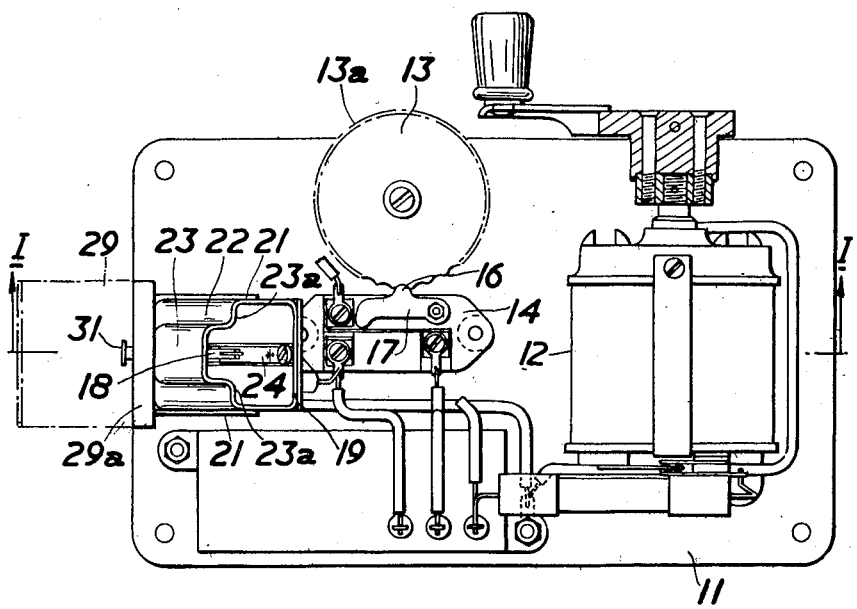

A preferred embodiment of the invention in which a hand-driven generator is employed will now be described, by way of example, with reference to the accompanying drawings, in which:

Figure 1 is a sectional side elevation of the charging unit and casing substantially on the line I—I of Figure 2, parts of the electrical circuit being omitted for the sake of clarity, and Figure 2 is a plan view of the charging unit with the casing removed.

Referring to the drawings, the charging unit comprises a small rectangular metal casing 10 mounted on a rectangular base 11 by which the unit may rest on a supporting surface. For constructional convenience the latter is preferably formed as a baseboard of insulating material, although a metal baseplate could be employed if desired. The metal casing 10 is connected to one side of a hand-driven generator 12, the casing and this side of the generator forming the "earth" of the charging unit. The circuit arrangement may be, for example, as described in the specification of my co-pending application for Letters Patent Serial No. 332,366 in which control of the flow of charging current to the charging pin of the unit is effected by means of either a push-button switch or a two-way switch controlled by means of a serrated disc. In the present arrangement a two-way switch is employed and the serrated disc 13 by which the two-way switch 14 is controlled is arranged so that a portion 13a thereof overlaps one of the sides of the baseboard 11 and protrudes through a slot 15 formed in a side wall of the casing 10 to enable the disc to be manually operated by applying a finger thereto. As each crest of a serration of the disc 13 passes a tooth 16 formed on the operating lever 17 of the switch, a portion of the charge in a reservoir condenser, not illustrated, is fed to a charging pin 18.

This pin is carried by a side wall 19 of a substantially rectangular metal socket member 20 connected to the earth side of the generator and secured in an inclined position to one end of the baseboard 11 by brackets 21. The socket member 20 is adapted at its upper end to receive the lower or charging end of a dosimeter and the outer inclined wall 22 of the socket member opposite the wall 19 is provided with a centrally arranged longitudinal channel portion 23 against the lower edges 23a of which the case of the dosimeter is pressed by a bowed leaf spring 24 secured to the wall 19 of the socket member. A block 25 of insulating material is secured to this wall and rigidly carries the inner end 18a of the charging pin which is normal to the wall and passes through an aperture 26 formed therein, the outer end 18b of the charging pin being bent at right angles so that it lies parallel to and within the walls of the socket 20.

As is clearly shown in Figure 1, the socket member 20 passes somewhat diagonally across an upper corner 10a of the casing and an aperture 27 is formed in the top 10b of the latter, the aperture being aligned with the upper end of the socket member in order to permit the lower end of the dosimeter to be slid into the upper portion of the socket member so that the charging pin of the dosimeter can be brought into contact with the free upper end 32 of the charging pin 18 of the charging unit. A slot 28 is centrally formed in the end wall 10c of the casing, such slot extending to the lower edge of the casing and substantially coinciding with the lower end of the socket member 20 so that the latter is open at both ends.

To enable the scale of the dosimeter to be illuminated whilst charging thereof is in progress, a brightly polished metal reflector or mirror 29 is mounted at the lower end of the socket member 20 so that light from any convenient source outside the casing 10 can be reflected upwardly through the socket and thus illuminate the scale of the instrument. The reflector 29 is mounted on a hinge 30 provided at its lower end and this hinge is pivotally secured to a downwardly turned extension 19a of the wall 19 of the socket member by a centrally arranged stem 30a so that the hinge and stem form a universally adjustable bearing about which the reflector can be swung when the charging unit is at rest on a supporting surface in order to reflect light from an external source upwardly through the socket member 20. In the drawings the reflector 29 is shown in broken lines in one of its operative positions and, when the charging unit is not in use, the reflector can be swung upwardly about the hinge 30 to the position shown in full lines in which position it closes the slot 28 and forms a door at the lower end of the socket member 20. To keep the reflector in this closed position the end thereof remote from the hinge 30 is turned at right angles, as shown at 29a, such bent portion abutting the upper horizontal edge of the slot 28 when the reflector is in its closed position. A knob 31 is provided to enable the upper end of the reflector 29 to be drawn outwardly from the slot. It will be appreciated that only the inner surface of the reflector 29 needs to be polished.

In order to enable the charging unit to be employed with dosimeters having cases of different diameters or with instruments in which the charging pin is not coaxial with the case, the upper end of the charging pin 18 of the unit is provided with an outwardly protruding ear 32 to increase the contact area of the pin. Such ear is constructed of material of thin gauge and is aligned with the axis of the charging pin 18 so as to offer the least possible obstruction to the light passing through the socket member 20.

I claim:

A charging unit for electroscopes of the kind set forth and comprising in combination a casing including a base by which the unit may rest on a supporting surface, a downwardly inclined socket member extending through the casing and open at its opposite ends at the top wall and a side wall of the casing, the upper end of the socket member being formed as a socket for receiving the charging end of an electroscope, hand-operated electric generator means mounted within the casing, a charging point fixed within said socket member at the base of the electroscope receiving socket, a conductor including switch means operatively interposed between said generator means and the charging point, a light reflector and a universal hinged mounting for said light reflector fixed to the unit at said side wall adjacent the lower end of the socket member, said reflector being movable about its hinged mounting, when the unit is at rest on a supporting surface, into a position at which the light from an external source is directed upwardly along the axis of the socket member for illuminating the electroscope.

References Cited in the file of this patent
UNITED STATES PATENTS

| | | |
|---|---|---|
| 1,855,669 | Glasser et al. | Apr. 26, 1932 |
| 1,917,851 | Paule | July 11, 1933 |
| 2,168,464 | Yeda | Aug. 8, 1939 |
| 2,594,660 | Lauritsen | Apr. 29, 1952 |
| 2,634,374 | Shonka | Apr. 7, 1953 |
| 2,648,777 | Landsverk | Aug. 11, 1953 |